United States Patent [19]
Rudoy et al.

[11] Patent Number: 5,438,173
[45] Date of Patent: Aug. 1, 1995

[54] CELL BYPASS SWITCH

[75] Inventors: Edward Rudoy, Woodland Hills; Leslie Kerek, Los Angeles, both of Calif.

[73] Assignee: G & H Technology, Inc., Camarillo, Calif.

[21] Appl. No.: 187,016

[22] Filed: Jan. 27, 1994

[51] Int. Cl.⁶ .................... H01H 35/00; H01H 37/74; H01M 14/00
[52] U.S. Cl. ................... 200/52 R; 307/10.7; 337/1; 429/7
[58] Field of Search .............. 200/17 R, 18, 52 R, 200/61.08; 337/1, 398–416; 307/10.7; 429/7, 61, 62; H01H 37/74, 37/76

[56] References Cited

U.S. PATENT DOCUMENTS

| | | | |
|---|---|---|---|
| 299,970 | 6/1884 | Fenner | 337/409 |
| 2,235,766 | 3/1941 | Knaack | 337/409 |
| 3,038,042 | 6/1962 | Hall et al. | 200/61.08 |
| 3,155,800 | 11/1964 | Denton | 337/409 |
| 3,761,856 | 9/1973 | Mantelet | 337/409 |
| 3,885,223 | 5/1975 | Green | 200/61.08 X |
| 3,924,688 | 12/1975 | Cooper et al. | 337/1 X |
| 4,075,448 | 2/1978 | Seedorf et al. | 200/262 |
| 4,356,469 | 10/1982 | Dozier | 337/401 |
| 4,390,763 | 6/1983 | Hruda | 200/144 B |
| 4,906,962 | 3/1990 | Diumstra | 337/239 |

FOREIGN PATENT DOCUMENTS

| | | |
|---|---|---|
| 429788 | 7/1923 | Germany . |
| 1056715 | 5/1959 | Germany . |
| 1141468 | 2/1985 | U.S.S.R. . |

*Primary Examiner*—J. R. Scott
*Attorney, Agent, or Firm*—Thomas I. Rozsa; Tony D. Chen

[57] ABSTRACT

The present invention is a cell bypass switch particularly designed for aerospace applications. The cell bypass switch can sense a battery cell failure and automatically opens an alternate path around the failed cell, bypassing the failure and allowing the remainder of the battery system to continue its function. The cell bypass switch is designed to be placed in parallel with the battery cell it protects. The present invention includes two electro-mechanical actuator assemblies which are mounted on the top end of the housing for operating two plungers respectively. Each of the electro-mechanical actuator assembly includes two spool halves which are held together by a tight winding of a restraining wire that terminates in a bridge wire connecting two electrical terminals of the electro-mechanical actuator. Each spool, by virtue of the restraining wire winding, can restrain a spring loaded plunger. However, when sufficient electrical current is passed through the terminals and the bridge wire, the bridge wire will heat up and break under the applied tension load. This causes the restraining wire to unwind, separating the spool halves and releasing the plunger.

20 Claims, 2 Drawing Sheets

CELL BYPASS SWITCH

BACKGROUND OF THE INVENTION

1. Field of The Invention

The present invention relates to switches designed to protect circuits that use a multiplicity of battery cells connected in series for aerospace applications. In particular, the present invention relates to cell bypass switches which can sense a battery cell failure and automatically provide an alternate path around the failed cell, thereby bypassing the failure and allowing the remainder of the battery system to continue its function.

2. Description of The Prior Art

Part of the problem which the present invention addresses is that usually a multiplicity of battery cells are connected in series in a battery system for aerospace applications. When one of the battery cells fails, the whole battery system stops functioning. A single battery cell failure will open the series circuit and the remaining battery cells within the circuit will stop operating. This is where the present invention comes into play.

The following ten (10) prior art patents were uncovered in the pertinent field of the present invention.

1. U.S. Pat. No. 299,970 issued to Fenner on Jun. 10, 1884 for "Automatic Fire Alarm" (hereafter "the Fenner Patent").
2. U.S. Pat. No. 2,235,766 issued to Knaack on Mar. 18, 1941 for "Thermal Alarm" (hereafter "the Knaack Patent").
3. U.S. Pat. No. 3,038,042 issued to Hall et al. on Jun. 5, 1962 for "Impact-Operable Electric Alarm Switch Devices" (hereafter "the Hall Patent").
4. U.S. Pat. No. 3,155,800 issued to Denton on Nov. 3, 1964 for "Single Action Temperature Sensitive Electrical Switch Including Camming Means For A Plunger Retaining Member" (hereafter "the Denton Patent").
5. U.S. Pat. No. 3,761,856 issued to Mantelet on Sep. 25, 1973 for "Thermal Warning Or Protection Device" (hereafter "the Mantelet Patent").
6. U.S. Pat. No. 4,075,448 issued to Seedoff et al. on Feb. 21, 1978 for "Cell Bypass Switches For Electrochemical Cell System" (hereafter "the Seedoff Patent").
7. U.S. Pat. No. 4,390,763 issued to Hruda on Jun. 28, 1973 for "Electrochemical Cell Shunting Switch Assembly With Matrix Array Of Switch Modules" (hereafter "the Hruda Patent").
8. German Patent No. 429,788 (hereafter "the '788 German Patent").
9. German Patent No. 1,056,715 (hereafter "the '715 German Patent").
10. Soviet Patent No. 1,141,468 (hereafter "the Soviet Patent").

The Fenner Patent discloses an automatic fire alarm. It utilizes a soft solder for retaining a spring biased rod. The solder is fusible at a low degree of heat. In the event of a fire, the solder will melt and release the rod which in turn is urged by the spring and presses on two electrical contacts to make them connected to actuate an alarm.

The Knaack Patent also discloses a thermal alarm. It utilizes a fusible element or pellet for regulating the movement of a spring biased transverse rod. The transverse rod has a sloping end face which is engaged with a spring biased longitudinal rod. In the event of overheating, the pellet becomes melted and allows the transverse rod to travel, which in turn releases the longitudinal rod. The movement of the longitudinal rod causes two electrical terminals to contact and thereby trigger an alarm.

The Hall Patent discloses an impact-operable electric alarm switch. It provides a mechanism for making electrical contact upon sudden impact or collision.

The Denton Patent discloses a single action temperature sensitive electrical switch which includes a camming means for a plunger retaining member. The switch has a cylindrical housing wherein a spring biased plunger can travel longitudinally to either make or break electrical connection between two electrical terminals mounted at one end of the cylindrical housing. The movement of the plunger is restrained by a V-shaped spring retainer member. The spring retainer member has two elongated legs. The two legs are held in place by a pellet located at the other end of the cylindrical housing. When the pellet is melted under heat, the spring retainer member is freed, which in turn allows the plunger to travel to make or break electrical connection between the two electrical terminals.

The Mantelet Patent discloses a thermal warning or protection device. The device utilizes a fusible washer for restraining a spring biased contact element. When the washer is melted under heat, the contact element will break the electrical contact between the two electrical terminals.

The Seedoff Patent discloses an electrochemical cell circuit utilizing vacuum interrupter cell bypass switches for preventing impurities from interfering with the switch operation.

The Hruda Patent discloses an electrochemical cell shunting switch assembly with matrix array of switch modules. It is used with a high continuous D.C. current electrochemical cell system for electrically shunting or by-passing a failed cell of the system.

The '788 German Patent discloses a device wherein a pair of arms are utilized for holding the nose of a pin which is biased by a spring. The pair of arms are connected to a sleeve which is also biased by a spring.

The '715 German Patent discloses a fuse device comprising a heating coil arrangement. The fuse device also has a movable spring biased pin which is secured by a solder element.

The Soviet Patent discloses a thermosensitive electrical circuit cut-out device. The Soviet device has two spring biased movable contacts and a solder element. When the solder element is melted, the two spring biased movable contacts quickly disengage the electrical connection of the circuit.

It can be seen that although various melt or pellet elements have been utilized in the prior art patents, almost all of the prior art heat sensitive devices are operating under direct external heat sources, and none of them has taught an electrical conducting solder wire for utilizing electrical current as the source to heat up the wire so that it will be melted to initiate the action of the plunger. In addition, none of the prior art has disclosed the feature of using collapsible collet fingers which upon the withdrawal of the plunger can pass through an elongated narrow channel to release the pin contact for making an electrical contact.

Therefore, it is highly desirable to have a very efficient and also very effective design and construction of a cell bypass switch which is used to protect circuits that utilize a multiplicity of battery cells connected in series.

SUMMARY OF THE INVENTION

The present invention is a novel and unique cell bypass switch particularly designed for aerospace applications. The cell bypass switch can sense a battery cell failure and automatically opens an alternate current path around the failed battery cell, thereby bypassing the failure and allowing the remainder of the battery system to continue its function. The cell bypass switch is designed to be placed in parallel with the battery cell it protects. When the battery cell is operational, the circuit current flows directly through the battery cell.

It has been discovered, according to the present invention, that in many situations such as in aerospace applications, it is highly desirable to employ cell bypass switches which will automatically provide an alternate path around a failed cell. Without this protection, a single cell failure will open the series circuit and the remaining cells within the circuit will stop functioning. Therefore, it is an important object of the present invention to provide a cell bypass switch which can automatically provide an alternate path around the failed battery cell, so that it bypasses the failure and allows the remainder of the battery system to continue its function.

It is another object of the present invention to provide a cell bypass switch which includes a pair of collapsible collet fingers connected to an electrical pin contact. The electrical pin contact is positioned so that it is on the axis of a pair of socket contacts and upon the withdrawal of two spring-loaded plungers, the collapsible fingers of the collet member can pass through an elongated narrow channel, thereby releasing the electrical pin contact. The pin contact will make electrical continuity with the pair of socket contacts to form an electrical circuit, thereby bypassing the failed cell.

It is an additional object of the present invention to provide a cell bypass switch which includes two electro-mechanical actuators. Each electro-mechanical actuator includes two spool halves which are held together by a restraining wire which is terminated in a bridge wire spanning the two electrical terminals of the electro-mechanical actuator. When sufficient electrical current is passed through the terminals and the bridge wire, the bridge wire will heat up and break under the applied tension load. This causes the restraining wire to unwind, separating the spool halves and releasing the plunger.

It is a further object of the present invention to provide a cell bypass switch which is versatile and has a very efficient and very effective design and construction so that the cell bypass switch can be modified for various battery types and power requirements.

It is an additional object of the present invention to provide a cell bypass switch with a reset mechanism which allows the cell bypass switch to be removed, refurbished and reassembled to provide increased testability.

It is a further object of the present invention to provide a cell bypass switch with two electro-mechanical actuators so that this redundancy prevents switch action by transient signals. If only one electro-mechanical actuator is fired, the other plunger will still be held by the spool of the other electro-mechanical actuator which prevents the collapse of collapsible fingers and no movement can take place, which means the switch will not bypass a good battery upon transient or error signals.

In the present invention cell bypass switch, two electro-mechanical actuator assemblies are mounted on the top end of the housing wherein a respective one electro-mechanical actuator assembly operates a respective one of two plungers. Each of the electro-mechanical actuator assemblies includes two spool halves which are held together by a tight winding of a stainless steel restraining wire that terminates in a bridge wire connecting two electrical terminals of the electro-mechanical actuator. Each spool, by virtue of the restraining wire winding, can restrain a spring loaded plunger. However, when sufficient electrical current is passed through the terminals and the bridge wire, the bridge wire will heat up and break under the applied tension load. This causes the restraining wire to unwind, separating the spool halves and releasing the plunger.

Two wire leads are connected from the battery system to the electro-mechanical actuator terminals respectively. Each actuator has two of these terminals. When the cell bypass switch is operational only a very small amount of current flows through the circuits which is insufficient to trigger the switch. The spool of each electro-mechanical actuator restrains a spring-loaded plunger. The far end of the plunger rests inside an open pair of collapsible fingers, keeping the collapsible fingers from snapping shut. The collapsible fingers are spring loaded and are connected to an electrical pin contact. The pin contact is positioned so that it is on the axis of a pair of socket contacts. If the pin contact was free to move, it could connect both the socket contacts, making an electrical connection. However, when the plunger is inside the collapsible fingers, the collet member is restrained from collapsing and passing through an elongated narrow channel and the pin contact has electrical continuity with only a single socket. Therefore, the switch remains in the opened condition.

When a battery cell fails, the current leakage begins to flow through the electro-mechanical actuator circuit. This causes a break in the bridge wire and rapid unwinding of the restraining wire which releases the spool, which in turn releases the plunger. The spring pressure drives the plunger through the spool, pulling the opposite end free of the collapsible fingers. When both plungers have moved away, the collapsible fingers snap together. Their reduced size now allows them to slip through the narrow slit in the partition that had restrained the collapsible fingers. The spring pressure now drives the collet member downward and pushes the electrical pin contact into contact with both the pair of socket contacts.

The switch action requires that both electro-mechanical actuators fire. This redundancy prevents switch action by transient signals. If only one electro-mechanical actuator fires, the other plunger will still be held by the spool of the other actuator which prevents the collapse of collapsible fingers and no movement can take place, which means the switch will not bypass a good battery upon transient or error signals.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
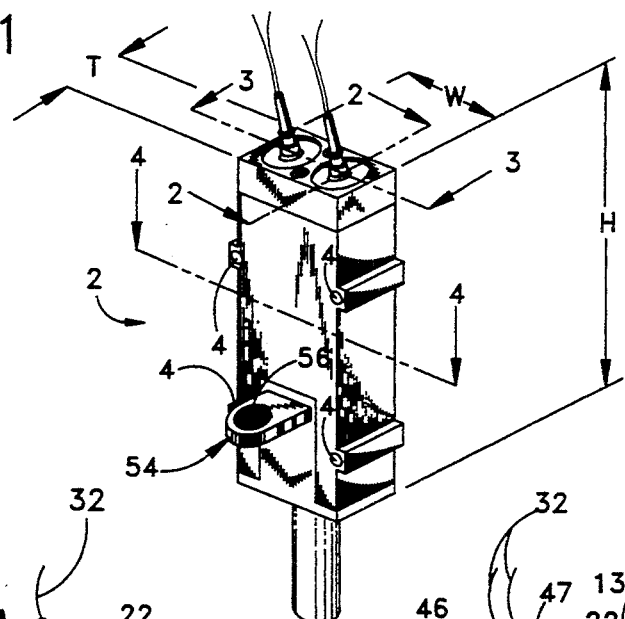
FIG. 1 is a perspective view of the preferred embodiment of the present invention cell bypass switch.

Referring to FIG. 1, there is shown at 2 the present invention cell bypass switch. By way of example, the overall height H, width W and thickness T of the present invention cell bypass switch 2 are approximately 3.645 inches by 1.325 inches by 0.865 inches respectively. By way of example, the weight of the cell bypass switch 2 is approximately 5.6 ounces and will include mounting means 4 which allow the user to mount the cell bypass switch 2 to an external structure. It will be appreciated that the dimensions and weight described above are merely one illustrative embodiment and the cell bypass switch 2 can include many other comparable sets of dimensions and weight.

Figure 2:
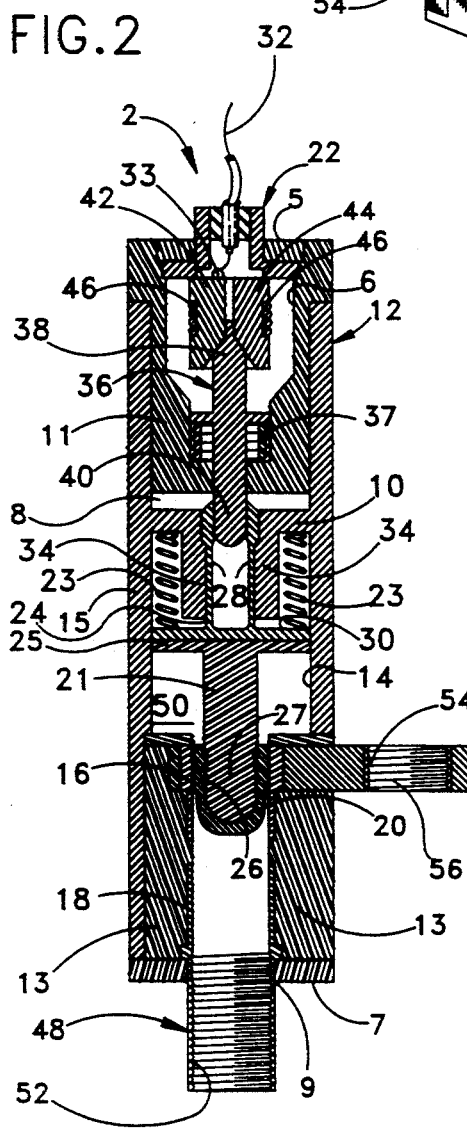
FIG. 2 is an enlarged cross-sectional view of the present invention cell bypass switch which is in its open condition, taken along line 2—2 of FIG. 1.
Figure 3:
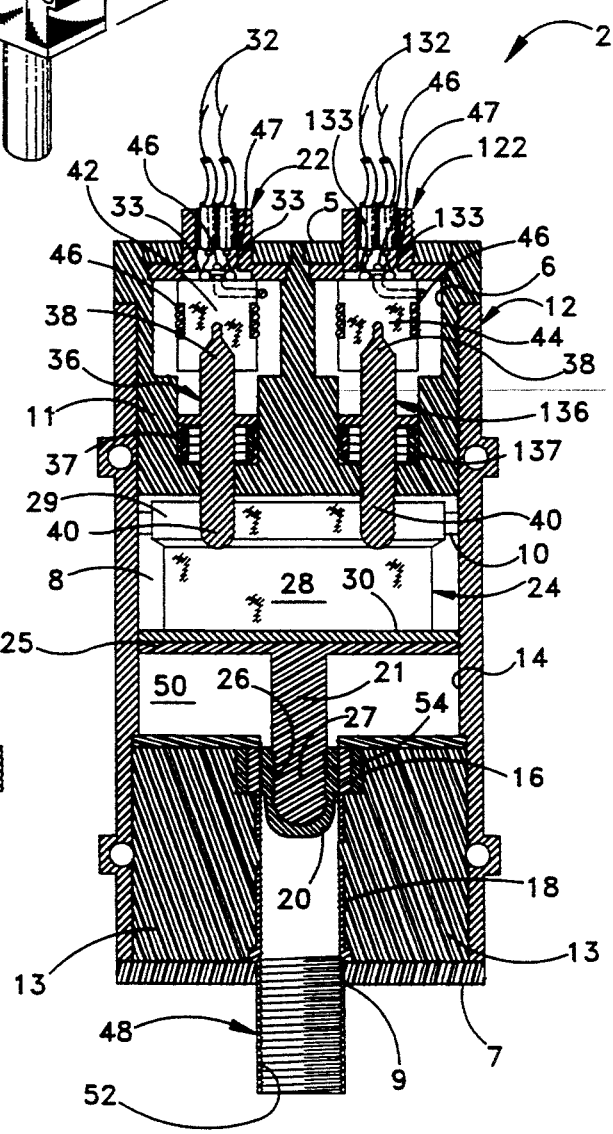
FIG. 3 is an enlarged cross-sectional view of the present invention cell bypass switch which is in its open condition, taken along line 3—3 of FIG. 1.
Figures 4, 5, 6:
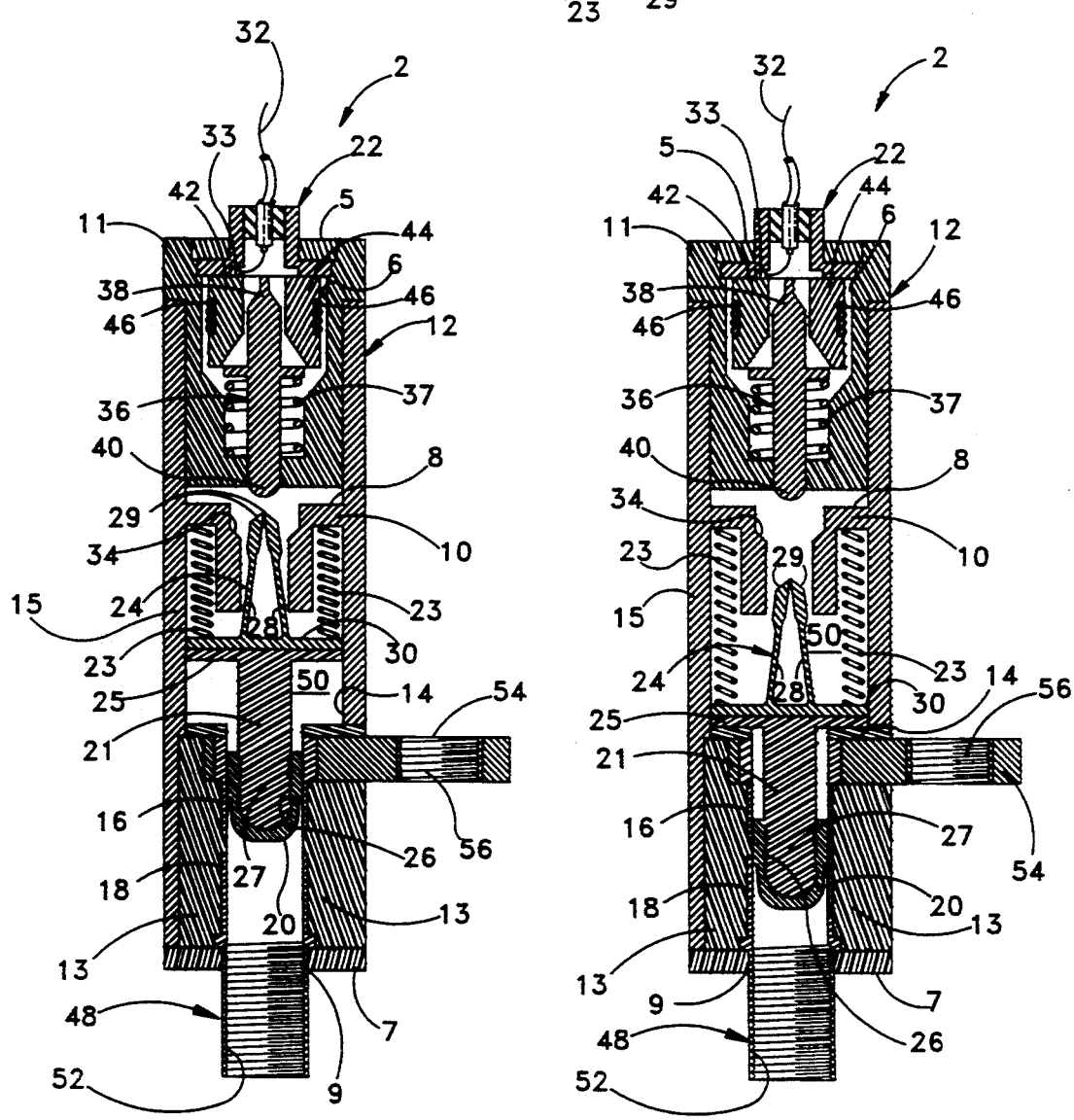
FIG. 4 is an enlarged cross-sectional view of the present invention cell bypass switch in its open condition, taken along line 4—4 of FIG. 1.
FIG. 5 is an enlarged cross-sectional view of the present invention cell bypass switch which is changing from its opened condition to its closed condition when a battery fails.
FIG. 6 is an enlarged cross-sectional view of the present invention cell bypass switch which is in its closed condition.

Referring to FIG. 2, 3, 4, 5 and 6, there is shown an enlarged cross-sectional view of the cell bypass switch 2 which has generally a rectangular shaped housing 12. The cell bypass switch 2 can sense a battery cell failure and automatically opens an alternate path around the failed cell, thereby bypassing the failure and allowing the remainder of the battery system to continue its function. FIGS. 2 through 4 show an enlarged cross-sectional view of the cell bypass switch 2 in its normal condition, where the cell bypass switch 2 is opened. FIG. 5 shows an enlarged cross-sectional view of the cell bypass switch 2 changing from the opened condition to the closed condition, in which the switch 2 failed, and FIG. 6 shows an enlarged cross-sectional view of the cell bypass switch 2 in its closed condition.

The cell bypass switch 2 is designed to be connected in parallel with the battery cell it protects. The cell bypass switch 2 is used in conjunction with an external power source and a battery cell which are conventional in aerospace application. The power source and the battery cell each have a first external terminal which is the positive or negative terminals and a second external terminal which is the positive or negative terminals. When the battery cell is operational, the circuit current flows directly through the battery, and only a very small amount of current flows through these circuits, which is insufficient to trigger the cell bypass switch 2.

Referring to FIGS. 2, 3 and 4, the components of the cell bypass switch 2 are located within a hollow chamber 50 of the rectangular shaped housing 12. The housing 12 has a top end 5 and a bottom end 7 with a central opening 9. The chamber 50 is separated into three compartments; an upper compartment 6, a center compartment 8 with a partition 10, and a lower compartment 14. At the top end 5 of the housing 12 there are two electromechanical actuators 22 and 122 which are insulated by an insulation material 11 and two pairs of lead wires 32 and 132 respectively connected to the electro-mechanical actuator terminals 33 and 133. The other ends of the two pairs of lead wires 32 and 132 are both connected respectively to the first and second external terminals of the power. It will be appreciated that the housing 12 is not limited to the rectangular shape. While the rectangular shaped housing is the preferred embodiment, it is also within the spirit and scope of the present invention to have a cylindrical shaped housing. In addition, it will not be too hard for one skilled in the art to form any multiplicity of configurations.

A first and a second hollow socket contacts 16 and 18 are mounted in a longitudinal direction within the lower compartment 14 and insulated by an insulation material 13. The first and second hollow socket contacts 16 and 18 are located at an upper location and a lower location adjacent to the bottom end 7 of the housing 12 respectively. The socket contacts 16 and 18 are spaced apart so that the socket contacts 16 and 18 are not connected to each other.

A hollow cylindrical body 48 is inserted through the central opening 9 which is adjacent to the bottom end 7 of the housing 12 and insulated by the insulation material 13. The hollow cylindrical body 48 has internal screw threads 52 with two opposite ends. One of the two opposite ends is connected to the second hollow socket contact 18 and the other end extends out from the housing 12 and is threadedly engaged with the second external terminal of the battery cell by conventional means.

A fastener means 54 is also mounted within the lower compartment 14 and insulated by the insulation material 13 away from the hollow cylindrical body 48. The fastener means 54 has a first end which is connected to the first hollow socket contact 16 and a second end which extends outwardly away from the housing 12. The second end has a threaded opening 56 for threadedly engaging with the first external terminal of the battery cell by conventional means.

An elongated cylindrical shaft 21 has a flat first end 25 and a screw threaded second end 27. An electrical pin contact 20 has an internal threaded opening 26 which is threadedly engaged to the screw threaded second end 27 of the elongated cylindrical shaft 21. The electrical pin contact is slidably assembled in the lower compartment 14 and can be engaged with the pair of socket contacts 16 and 18 for providing electrical continuity between the pair of socket contacts 16 and 18. The electrical pin contact 20 is positioned so that it is on the axis of the pair of socket contacts 16 and 18.

A collet member 24 is biased downwardly by a first and second tension spring means 23 which are located at the center compartment 8 of the housing 12. The collet member 24 has two collapsible fingers 28 with enlarged top ends 29 and a base 30, where the base 30 is attached to the flat first end 25 of the elongated cylindrical shaft 21, and the enlarged top ends 29 of the collapsible fingers 28 are extended through an elongated narrow channel or passage 34 in the partition 10. The elongated narrow channel 34 extends downward to a midsection 15 of the center compartment 8.

Two plungers 36 and 136 are respectively biased upwardly by a third and fourth tension spring means 37 and 137 respectively. Both of the tension spring means 37 and 137 are located at the upper compartment 6 of the housing 12. Each plunger has a first end 38 and a second end 40. The second ends 40 of the two plungers 36 and 136 are inserted between the collapsible fingers 28 of the collet member 24 to prevent the collapsible fingers 28 of the collet member 24 from snapping shut. The purpose of using two plungers is to provide redundancy for preventing the cell bypass switch 2 from actuation by transient signals. When the second ends 40 of the plungers 36 and 136 are inserted between the enlarged top ends 29 of the collapsible fingers 28 of the collet member 24, the collapsible fingers 28 are restrained from collapsing and their enlarged top ends 29 are blocked by the elongated narrow channel 34 in the partition 10 so that the collet member 24 cannot move and the electrical pin contact 20 does not establish electrical continuity between the pair of socket contacts 16 and 18, as shown in FIGS. 2 and 3. Therefore, the cell bypass switch 2 remains in the opened condition.

Two electro-mechanical actuators 22 and 122 are symmetrically mounted in the upper compartment 6 of the housing 12. Each electro-mechanical actuator comprises a first spool half 42 and a second opposite spool half 44 which are bounded together by a tight winding of a stainless steel restraining wire or restraining means 46 which is terminated in a bridge wire 47 spanning between the electrical terminals 33 (only one is shown in FIG. 2)) of the electro-mechanical actuator such that the restraining wire 46 compresses the two spool halves 42 and 44 together to prevent the plunger 36 or 136 from moving upwardly therethrough.

When the battery cell fails, current leakage begins to flow through the lead wires 32 and 132 the bridge wire 47 such that the bridge wire 47 heats up and reduces its tensile strength until the applied loading breaks the bridge wire 47. This occurs when the current reaches approximately two and half (2½) amperes. The sensitivity of the bridge wire 47 can be adjusted, depending on the application. The break in the bridge wire 47 triggers the switching action and closes an alternate circuit that bypasses the failed cell and allows the battery circuit to continue its function.

The failed battery cell is bypassed when the electrical pin contact 20 contacts the pair of socket contacts 16 and 18. The alternate circuit is activated between the hollow cylindrical body 48 and the fastener means 54.

The break of the bridge wire 47 in each actuator causes rapid unwinding of the two respective spool halves 42 and 44, thereby releasing the plungers 36 and 136. The spring pressure from the pair of tension spring means 37 and 137 drives the two plungers 36 and 136 through the respective two spool halves 42 and 44, pulling the second ends 40 of the plungers 36 and 136 free and off from the enlarged top ends 29 of the collapsible fingers 28 of the collet member 24.

Referring to FIGS. 5 and 6, when both of the plungers 36 and 136 have moved away, the collapsible fingers 28 of the collet member 24 snap together. Their reduced size now allows them to slip between the elongated narrow channel 34 in the partition 10 that had restrained the collapsible fingers 28 of the collet member 24. The spring pressure from the pair of tension spring means 23 now drives the collet member 24 downward and pushes the electrical pin contact 20 into contact with the pair of socket contacts 16 and 18, as shown in FIG. 6. Spring motion will position the electrical pin contact 20 so that it spans both the socket contacts 16 and 18, making electrical contact and allowing the new circuit to bypass the failed cell. Switching will be accomplished in less than twenty (20) milliseconds at five (5) amperes. The voltage drop in the circuit following actuation will be less than twenty-five (25) millivolts at two hundred (200) amperes.

The cell bypass switch 2 actuation requires that both electro-mechanical actuators 22 and 122 fire. This redundancy prevents cell bypass switch 2 action by transient signals or other failures. The cell bypass switch 2 will have a no-fire current rating of 1.2 amperes. If only one electro-mechanical actuator 22 is fired, the other plunger 136 will still be held by the collapsible fingers 28 of the collet member 24 and no movement can take place.

The cell bypass switch 2 can be made from several materials. The cell bypass switch 2 is preferably made from space grade materials and will be compatible with a space mission environment. The material used will minimize outgassing and permits the cell bypass switch 2 to operate at the required temperatures of $-150°$ C. ($-238°$ F.) to $+121°$ C. ($+250°$ F.). The overall design will have excellent resistance to shock and vibration.

The insulation material used by the cell bypass switch 2 is preferably plastic. However, any suitable insulated material is sufficient.

Defined in detail, the present invention is a cell bypass switch for sensing a battery cell failure and automatically providing an alternate path around the battery cell failure, the cell bypass switch connected to a first external terminal and a second external terminal, the switch comprising: (a) a generally rectangular shaped housing having an upper compartment with a top end, a center compartment with a partition, and a lower compartment with a bottom end, the partition having an elongated narrow channel extending downwardly to a midsection of the lower compartment; (b) a first hollow socket contact and a second hollow socket contact mounted in a longitudinal direction within said lower compartment and insulated by a first insulation material away from each other, where the first and second socket contacts are located at an upper location and a lower location adjacent said bottom end of said housing respectively; (c) an electrical pin contact having an internal threaded opening; (d) an elongated cylindrical rod having a flat first end and a screw threaded second end, the screw threaded second end threadedly screwed into said internal threaded opening of said electrical pin contact which is positioned in said lower compartment and slidably engageable with said first and second socket contacts; (e) a collet member biased downwardly by a first and a second tension spring means respectively and located at locations opposite to each other, the collet member having a base and two collapsible fingers, where the base is attached to said flat first end of said elongated cylindrical rod, and the two collapsible fingers each having an enlarged top end extending upwardly through said elongated narrow channel in said partition; (f) two electro-mechanical actuator assemblies insulated by a second insulation material and symmetrically mounted in said upper compartment of said housing for respectively operating a respective one of two plungers, each electro-mechanical actuator assembly having a first spool half and a second opposite spool half bounded by a restraining wire which is terminated in a bridge wire and compressed inwardly for preventing a respectively one of the two plungers from moving upwardly therethrough; (g) said two plungers biased upwardly by a third and fourth tension spring means respectively, and inserted between said collapsible fingers of said collet member for preventing said enlarged top ends of said collapsible fingers from snapping shut, and sliding through said elongated narrow channel in said partition, thereby restraining said collet member from moving downwardly, which in turn prevents said electrical pin contact from sliding downwardly and making electrical connection between said first and second socket contacts, said two plungers further providing redundancy to prevent said cell bypass switch from malfunction upon transient signals; (h) a hollow cylindrical body having internal screw threads and inserted through said bottom end of said housing and insulated by said second insulation material, the hollow cylindrical body having one end connected to said second hollow socket contact, and the other end extending out from said housing for threadedly engaging to said second external terminal; and (i) a fastener means having a first end and a second end with a threaded opening and mounted into said lower compartment and insulated by said second insulation material away from said hollow cylindrical body, the first end connected to said first hollow socket contact, and the second end extending outwardly away from said housing for threadedly engaging with said first external terminal; (j) whereby when said battery cell fails and electrical current is passed through said bridge wires such that said bridge wires will heat up and break, this will cause said two restraining wires to unwind and separate said first and second spool halves of said two electro-mechanical actuator assemblies respectively, which allows said two plungers to move upwardly and release said enlarged top ends of said two collapsible fingers such that they can collapse and slide through said narrow channel in said partition, allowing said collet member to move downwardly, which in turn pushes said electrical pin contact to slide downwardly, and contacting said first and second socket contacts and making electrical connection therebetween, to provide a bypass of said failed battery cell.

Defined broadly, the present invention is a cell bypass switch for sensing a battery cell failure and automatically providing an alternate path around the battery cell failure, the cell bypass switch connected to a first external terminal and a second external terminal, the switch comprising: (a) a housing having an upper compartment with a top end, a center compartment with a partition, and a lower compartment with a bottom end, the partition having an elongated narrow channel; (b) a pair of spaced apart electrical contacts mounted in a longitudinal direction within said lower compartment of said housing and insulated by a first insulation material away from each other; (c) an elongated electrical pin contact having a first end and a second end, where the second end is positioned in said lower compartment and slidably engageable with said pair of spaced apart socket contacts; (d) a collet member biased downwardly by a pair of tension spring means, the collet member having a base and at least two collapsible fingers, where the base is attached to said first end of said elongated electrical pin contact, and the at two collapsible fingers extending upwardly through said elongated narrow channel in said partition; (e) at least one plunger having a first end and a second end and biased upwardly by a tension spring means, the second end of the at least one plunger inserted between said at least two collapsible fingers of said collet member for preventing said at least two collapsible fingers of said collet member from snapping shut; (f) at least one electro-mechanical actuator insulated by a second insulation material and mounted in said upper compartment of said housing and having a segment spool bounded by a restraining wire which is terminated in a bridge wire and compressed inwardly for preventing said first end of said at least one plunger from moving upwardly therethrough; (g) a cylindrical body inserted through said bottom end of said housing and insulated by said first insulation material, the cylindrical body having one end connected to a respective one of said pair of spaced apart socket contacts, and the other end extending out from said housing for attaching to said second external terminal; and (h) a fastener means mounted to said lower compartment and insulated by said first insulation material away from said cylindrical body, the fastener means having one end connected to said respective one of said pair of spaced apart socket contacts, and the other end extending outwardly away from said housing for attaching to said first external terminal; (i) whereby when said battery cell fails and electrical current is passed through said bridge wire such that said bridge wire heats up and breaks, and causes said restraining wire to unwind and release said segmented spool of said at least one electro-mechanical actuator, this allows said at least one plunger to move upwardly therethrough, said at least two collapsible fingers can collapse and pass through said elongated narrow channel in said partition which allows said collet member to move downwardly and cause said electrical pin contact to slide and contact said pair of socket contacts, and thereby provide a bypass to said battery cell failure.

Defined even more broadly, the present invention is a bypass switch for sensing a battery cell failure and automatically providing an alternate path around the battery cell failure, and used in conjunction with a first terminal and a second terminal, the switch comprising: (a) a pair of spaced apart contacts and a pin contact slidably engageable with the pair of contacts for making electrical continuity; (b) a spring biased collet means connected to said pin contact and having a base and at least two collapsible fingers extending through a passage in a panel; (c) a spring biased plunger inserted between said at least two collapsible fingers of said spring biased collet means for preventing said at least two collapsible fingers from collapsing and withdrawing through said passage of said panel; and (d) means for removing said spring biased plunger upon failure of said battery cell; (e) whereby when said battery cell fails, said spring biased plunger is removed and said at least two collapsible fingers can collapse and slide through said passage in said panel for allowing said pin contact to connect to said pair of contacts, and thereby provide a bypass to said battery cell failure.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

Defined more broadly, the present invention is a bypass switch for sensing a battery cell failure and automatically providing an alternate path around the battery cell failure, used in conjunction with a first terminal and a second terminal, the switch comprising: (a) a housing having a hollow chamber with a partition, where the partition has a narrow passage; (b) a pair of contacts mounted within said hollow chamber of said housing; (c) a pin contact slidably engageable with said pair of contacts; (d) a spring biased collet member having a base connected to said pin contact, and at least two fingers extending through said narrow passage in said partition; (e) at least one spring biased plunger inserted between said at least two fingers of said spring biased collet member for preventing said at least two fingers of said spring biased collet member from collapsing; and (f) at least one electro-mechanical actuator having a spool bounded by a restraining wire which is terminated in a bridge wire for restraining said at least one spring biased plunger from disengaging with said at least two fingers of said collect member; (g) means for connecting to a respective one of said pair of contacts to said first terminal; and (h) means for connecting to said respective one of said pair of contacts to said second terminal; (i) whereby when said battery cell fails, electrical current is passed through said bridge wire such that said bridge wire heats up and breaks, and causes said restraining wire to unwind and allow said at least one spring biased plunger to move upwardly, which in turn allows said at least two fingers to collapse and slide through said narrow passage in said partition for allowing said collet member to move which causes said pin contact to move and connect to said pair of contacts, and thereby provide a bypass to said battery cell failure.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A cell bypass switch for sensing a battery cell failure and automatically providing an alternate path around the battery cell failure, the battery cell having a first external terminal and a second external terminal, the switch comprising:

a. a housing having an upper compartment with a top end, a center compartment with a partition, and a lower compartment with a bottom end, the partition having an elongated narrow channel extending downwardly to a midsection of the center compartment;

b. a first hollow socket contact and a second hollow socket contact mounted in a longitudinal direction within said lower compartment and insulated by a first insulation material away from each other, where the first and second socket contacts are located at an upper location and a lower location adjacent said bottom end of said housing respectively;

c. an electrical pin contact having an internal threaded opening;

d. an elongated cylindrical shaft having a flat first end and a screw threaded second end threadedly screwed into said internal threaded opening of said electrical pin contact and positioned in said lower compartment and slidably engageable with said first and second socket contacts;

e. a collet member biased downwardly by first tension spring means and second tension spring means respectively and located at locations opposite to each other, the collet member having a base and two collapsible fingers, the base attached to said flat first end of said elongated cylindrical shaft, and the two collapsible fingers each having an enlarged top end extending upwardly through said elongated narrow channel in said partition of said center compartment;

f. two electro-mechanical actuator assemblies insulated by a second insulation material and symmetrically mounted in said upper compartment of said housing for respectively operating a respective one of two plungers, each electro-mechanical actuator assembly having a first spool half and a second opposite spool half bounded by a restraining wire terminated in a bridge wire and compressed inwardly for preventing the respective one of the two plungers from moving upwardly therethrough;

g. said two plungers biased upwardly by third spring means and fourth tension spring means respectively, and inserted between said collapsible fingers of said collet member for preventing said enlarged top ends of said collapsible fingers from snapping shut, and sliding through said elongated narrow channel in said partition of said center compartment, thereby restraining said collet member from moving downwardly, which in turn prevents said electrical pin contact from sliding downwardly and making electrical connection between said first and second socket contacts, said two plungers further providing redundancy to prevent said cell bypass switch from malfunction upon transient signals;

h. a hollow cylindrical body inserted through said bottom end of said housing and insulated by said second insulation material, the hollow cylindrical body having internal screw threads with one end connected to said second hollow socket contact and the other end extending out from said housing for threadedly engaging with said second external terminal of said battery cell; and i. a fastener means having a first end and a second end with a threaded opening and mounted within said lower compartment and insulated by said second insulation material away from said hollow cylindrical body, the first end connected to said first hollow socket contact, and the second end extending outwardly away from said housing for threadedly engaging with said first external terminal of said battery cell;

j. whereby when said battery cell fails and electrical current is passed through said bridge wires such that said bridge wires will heat up and break, this will cause said two restraining wires to unwind and separate said first and second spool halves of said two electro-mechanical actuator assemblies respectively, which allows said two plungers to move upwardly and release said enlarged top ends of said two collapsible fingers such that they can collapse and slide through said narrow channel in said partition of said center compartment, allowing said collet member to move downwardly, which in turn pushes said electrical pin contact to slide downwardly, and contacting said first and second socket contacts and making electrical connection therebetween, to provide a bypass of said failed battery cell.

2. The invention as defined in claim 1 further comprising means for mounting said cell bypass switch to an external structure.

3. The invention as defined in claim 1 wherein each of said respective one of said two electro-mechanical actuators further comprises a pair of lead wires, each having a first end and a second end, where the first ends are connected to a source of electrical current, and the second ends are connected to said bridge wire of said respective one of said two electro-mechanical actuators respectively.

4. The invention as defined in claim 1 wherein said first and second insulation material are plastic.

5. A cell bypass switch for sensing a battery cell failure and automatically providing an alternate path around the battery cell failure, the battery cell having a first external terminal and a second external terminal, the switch comprising:
   a. a housing having an upper compartment with a top end, a center compartment with a partition, and a lower compartment with a bottom end, the partition having an elongated narrow channel;
   b. a pair of spaced apart electrical contacts mounted in a longitudinal direction within said lower compartment of said housing and insulated by a first insulation material away from each other;
   c. an elongated electrical pin contact having a first end and a second end positioned in said lower compartment and slidably engageable with said pair of electrical contacts;
   d. a collet member biased downwardly by a pair of tension spring means, the collet member having a base and at least two collapsible fingers, the base attached to said first end of said elongated electrical pin contact, and the at two collapsible fingers extending upwardly through said elongated narrow channel in said partition of said center compartment;
   e. at least one plunger biased upwardly by tension spring means and having a first end and a second end inserted between said at least two collapsible fingers of said collet member for preventing said at least two collapsible fingers of said collet member from snapping shut;
   f. at least one electro-mechanical actuator insulated by a second insulation material and mounted in said upper compartment of said housing and having a segment spool bounded by a restraining wire terminated in a bridge wire and compressed inwardly for preventing said first end of said at least one plunger from moving upwardly therethrough;
   g. a cylindrical body inserted through said bottom end of said housing and insulated by said first insulation material, the cylindrical body having one end connected to a respective one of said pair of electrical contacts, and the other end extending out from said housing for attaching to said second external terminal of said battery cell; and
   h. a fastener means mounted within said lower compartment and insulated by said first insulation material away from said cylindrical body, the fastener means having one end connected to said respective one of said pair of electrical contacts, and the other end extending outwardly away from said housing for attaching to said first external terminal of said battery cell;
   i. whereby when said battery cell fails and electrical current is passed through said bridge wire such that said bridge wire heats up and breaks, and causes said restraining wire to unwind and release said segmented spool of said at least one electro-mechanical actuator, this allows said at least one plunger to move upwardly therethrough, said at least two collapsible fingers can collapse and pass through said elongated narrow channel in said partition of said center compartment which allows said collet member to move downwardly and cause said electrical pin contact to slide and contact said pair of socket contacts, and thereby provide a bypass to said battery cell failure.

6. The invention as defined in claim 5 further comprising means for mounting said cell bypass switch to an external structure.

7. The invention as defined in claim 5 further comprising at least a pair of lead wires, each having a first end and a second end, where the first ends are connected to a source of electrical current, and the second ends are connected to said bridge wire of said at least one electro-mechanical actuator.

8. The invention as defined in claim 5 wherein said first and second insulation material are plastic.

9. A bypass switch for sensing a battery cell failure and automatically providing an alternate path around the battery cell failure, the battery cell having a first terminal and a second terminal, the switch comprising:
   a. a housing having a hollow chamber with a partition, the partition having a narrow passage;
   b. a pair of contacts mounted within said hollow chamber of said housing;
   c. a pin contact slidably engageable with said pair of contacts;
   d. a spring biased collet member having a base connected to said pin contact, and at least two fingers extending through said narrow passage in said partition;
   e. at least one spring biased plunger inserted between said at least two fingers of said spring biased collet member for preventing said at least two fingers of said spring biased collet member from collapsing; and
   f. at least one electro-mechanical actuator having a spool bounded by a restraining wire terminated in a bridge wire for restraining said at least one spring biased plunger from disengaging with said at least two fingers of said collect member;
   g. means for connecting to a respective one of said pair of contacts to said first terminal of said battery cell; and
   h. means for connecting to said respective one of said pair of contacts to said second terminal of said battery cell;

i. whereby when said battery cell fails, electrical current is passed through said bridge wire such that said bridge wire heats up and breaks, and causes said restraining wire to unwind and allow said at least one spring biased plunger to move upwardly, which in turn allows said at least two fingers to collapse and slide through said narrow passage in said partition for allowing said collet member to move which causes said pin contact to move and connect to said pair of contacts, and thereby provide a bypass to said battery cell failure.

10. The invention as defined in claim 9 further comprising wire means connected between said at least one electro-mechanical actuator and a source of electrical current.

11. The invention as defined in claim 9 further comprising means for mounting said bypass switch to an external structure.

12. A bypass switch for sensing a battery cell failure and automatically providing an alternate path around the battery cell failure, the battery cell having a first terminal and a second terminal, the switch comprising:
   a. a pair of spaced apart contacts;
   b. a pin contact slidably engageable with said pair of contacts for making electrical continuity;
   c. a spring biased collet means connected to said pin contact and having a base and at least two collapsible fingers extending through a passage in a panel;
   d. a spring biased plunger inserted between said at least two collapsible fingers of said spring biased collet means for preventing said at least two collapsible fingers from collapsing and withdrawing through said passage of said panel; and
   e. means for removing said spring biased plunger upon failure of said battery cell;
   f. whereby when said battery cell fails, said spring biased plunger is removed and said at least two collapsible fingers can collapse and slide through said passage in said panel for allowing said pin contact to connect to said pair of contacts, and thereby provide a bypass to said battery cell failure.

13. The invention as defined in claim 12 wherein said spring biased collet means is biased by tension spring means.

14. The invention as defined in claim 12 wherein said spring biased plunger is biased by another tension spring means.

15. The invention as defined in claim 12 wherein said means for removing said spring biased plunger upon failure of said battery cell includes an electro-mechanical actuator.

16. The invention as defined in claim 15 wherein said electro-mechanical actuator comprises a segmented spool for restraining said spring biased plunger.

17. The invention as defined in claim 16 wherein said segmented spool is bounded by a restraining wire which terminates into a bridge wire, which will break up when said battery cell fails.

18. The invention as defined in claim 15 further comprising means for connecting said electro-mechanical actuator to a source of electrical current.

19. The invention as defined in claim 12 further comprising means for mounting said bypass switch to an external structure.

20. The invention as defined in claim 12 further comprising means for respectively connecting said pair of spaced apart contacts to said first and second terminals of said battery cell to bypass said battery cell failure.

* * * * *